Sept. 12, 1961          J. TENGER          2,999,289
DEVICE FOR HOLDING OBJECTS MORE PARTICULARLY WELDING RODS
Filed April 22, 1958
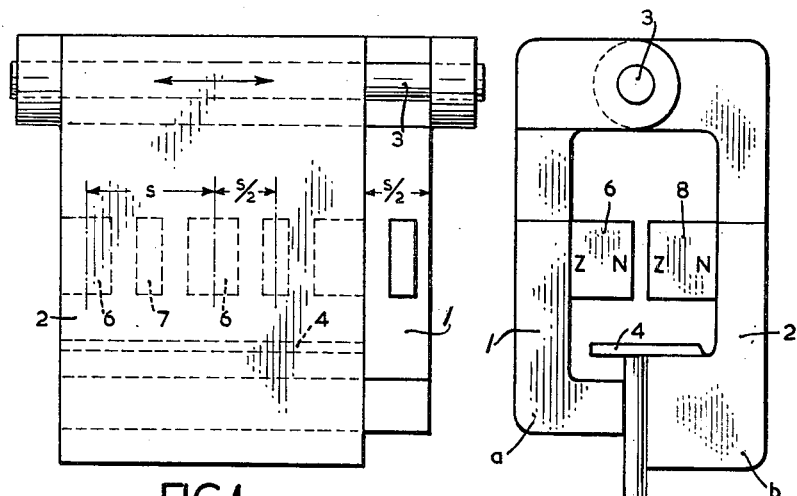
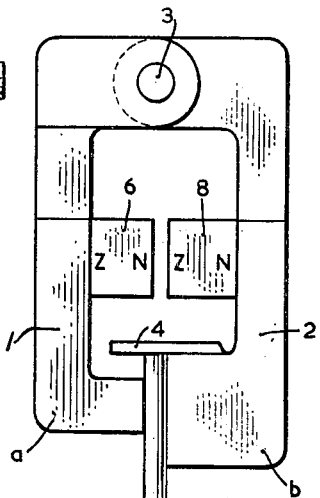
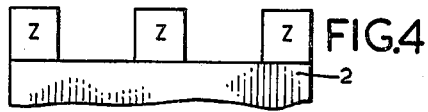
INVENTOR
JAN TENGER
BY
AGENT

United States Patent Office 2,999,289
Patented Sept. 12, 1961

2,999,289
DEVICE FOR HOLDING OBJECTS MORE PARTICULARLY WELDING RODS
Jan Tenger, Eindhoven, Netherlands, assignor to North American Philips Company, Inc., New York, N.Y., a corporation of Delaware
Filed Apr. 22, 1958, Ser. No. 730,083
Claims priority, application Germany May 4, 1957
4 Claims. (Cl. 24—248)

The present invention relates to a device for holding a plurality of objects. More particularly, the invention relates to a device for holding a plurality of elongated objects, such as welding rods, by means of magnets.

A device of the type of the present invention may be used more particularly in connection with transport devices, for example furnaces and drying devices. The device according to the invention is suited more particularly for temporarily holding and rapidly releasing a whole series of objects. The device of the present invention comprises pivotally-arranged holding jaws which can be closed by means of magnets and thus hold between them one or a plurality of objects.

The jaws are preferably also opened by means of magnets. For this purpose, in one preferred embodiment of the invention, the jaws may be displaceable along their axes of articulation. Thus, in one position of the jaws at least two magnet poles coact which attract each other and in another position two magnet poles coact which repel each other.

The jaws may have an elongated shape in the direction of their axis or axes of articulation, so that they can hold between them a series of objects.

In such an embodiment, magnet poles are preferably arranged along one jaw which alternately attract and repel each other. The poles attracting each other preferably have double the length of the poles repelling each other and the short poles are preferably arranged midway the pitch of the long poles. The other jaw has only a series of long poles arranged with the same pitch. The jaws are displaceable over a path equal to half the pitch.

In order that the invention may be readily carried into effect, it will now be described more fully, by way of example, with reference to the accompanying drawing, in which:

FIG. 1 is an elevation view of an embodiment of the holding device of the present invention;

FIG. 2 is a side view of the embodiment of FIG. 1;

FIG. 3 is a sectional view of one of the pole pieces 6 taken perpendicularly to the object 5, and FIG. 4 is a sectional view of one of the pole pieces 8 taken perpendicular to the object 5.

The device of the present invention comprises two jaws 1 and 2, which are pivotally connected to a shaft 3 in a manner such that the jaw 2 is movable with respect to the jaw 1 over a length $$\frac{S}{2}$$

This movement can take place at a suitable point by means of members (not shown), for example cams or the like.

Each end of the shaft 3 may, for example, be articulated to transport chains which can be moved through a furnace, a drying device or the like.

An abutment plate 4 of non-magnetic material, such as brass or rustless steel, is connected to the jaw 2 so that a series of objects 5 may be held between the jaws 1 and 2 in the manner shown in FIG. 2.

The jaw 1 has, in the direction of its length, a plurality of alternately long and short pole-pieces 6 and 7 (see FIG. 3). The pitch of the pole-pieces 6 is S. The pole piece 7 is located midway the pitch. The pole-pieces 6 and 7 have, for example, alternately north and south polarity. The jaw 2 has, for example, only pole-pieces 8 with south poles (see FIG. 4). The upper part of the jaws in FIG. 2 consist of non-magnetic material.

In the closed position, the north and south poles of the long pole pieces face each other, so that the jaws can firmly clamp the objects 5 between them.

As soon as the jaws are displaced in the longitudinal direction over the length $$\frac{S}{2}$$

the south poles of the pole pieces 7 and 8 come to face each other, their repelling action causing the jaws to be opened.

While the invention has been described by means of a specific example and in a specific embodiment, I do not wish to be limited thereto, for obvious modifications will occur to those skilled in the art without departing from the spirit and scope of the invention.

What is claimed is:

1. A device for holding a plurality of objects, comprising a pivot pin, a pair of jaws rotatably and slidably mounted on said pin in a manner whereby said jaws are axially rotatable about the said pin and axially displaceable on said pin relatively to each other, said jaws having a substantially elongated shape in the direction of said pin, and a plurality of permanent magnets positioned in substantial alignment parallel to said pin and in spaced relation to each other on opposing surfaces of said jaws, one of said jaws having magnets of both polarities in a manner whereby when the said jaws are in one axial position relative to each other opposing ends of said magnets on said opposing surfaces are of opposite polarity and attract the said jaws to each other thereby simultaneously holding said objects clamped between them when the said jaws are axially shifted relative to each other and when the said jaws are in one axial position relative to each other the opposing magnets are of the same polarity and repel the said jaws from each other thereby maintaining the said jaws separated.

2. A device for holding a plurality of objects, comprising a pivot pin, a pair of jaws rotatably and slidably mounted on said pin in a manner whereby said jaws are axially rotatable about the said pin and axially displaceable on said pin relatively to each other, said jaws having a substantially elongated shape in the direction of said pin, and a plurality of permanent magnets of the same polarity positioned in substantial alignment parallel to said pin and in spaced relation to each other on a surface of one of said jaws, a plurality of permanent magnets of the polarity opposite that of said first-mentioned polarity positioned in substantial alignment between said first-mentioned magnets on said surface of said one jaw, and a plurality of permanent magnets of the polarity opposite that of said first-mentioned polarity positioned in substantial alignment in spaced relation to each other on the opposing surface of the other of said jaws in a manner whereby said magnets of said other jaw are positioned opposite said magnets of said one jaw of opposite polarity and attract the said jaws to each other thereby simultaneously holding said objects clamped between them when the said jaws are in one axial position relative to each other and the said magnets of said other jaw are positioned opposite the said magnets of said one jaw of the same polarity and repel the said jaws from each other thereby maintaining the said jaws separated when the said jaws are axially shifted relative to each other.

3. A device for holding a plurality of objects, comprising a pivot pin, a pair of jaws rotatably and slidably mounted on said pin in a manner whereby said jaws are axially rotatable about the said pin and axially displaceable on said pin relatively to each other, said jaws having a substantially elongated shape in the direction of said pin, and a plurality of permanent magnets of the same polarity positioned in substantial alignment parallel to said pin and in equally spaced relation to each other on a surface of one of said jaws, a plurality of permanent magnets of the polarity opposite that of said first-mentioned polarity positioned in substantial alignment between said first-mentioned magnets on said surface of said one jaw, each of said last-mentioned magnets being positioned midway between adjacent ones of said first-mentioned magnets and being narrow relative to the said first-mentioned magnets, and a plurality of permanent magnets of the polarity opposite that of said first-mentioned polarity positioned in substantial alignment in equally spaced relation to each other on the opposing surface of the other of said jaws, said last-mentioned magnets being of substantially the same width as said first-mentioned magnets, the distance between said last-mentioned magnets being equal to the distance between said first mentioned magnets, said last-mentioned magnets being positioned in a manner whereby said magnets of said other jaw are positioned opposite said magnets of said one jaw of opposite polarity and attract the said jaws to each other thereby simultaneously holding said objects clamped between them when the said jaws are in one axial position relative to each other and the said magnets of said other jaw are positioned opposite the said magnets of said one jaw of the same polarity and repel the said jaws from each other thereby maintaining the said jaws separated when the said jaws are axially shifted a distance equal to half the distance between the midpoints of adjacent ones of said first-mentioned magnets relative to each other.

4. A device for holding a plurality of objects, comprising a pivot pin, a pair of jaws rotatably and slidably mounted on said pin in a manner whereby said jaws are axially rotatable about the said pin and axially displaceable on said pin relatively to each other, said jaws having a substantially elongated shape in the direction of said pin, a plurality of permanent magnets positioned in substantial alignment parallel to said pin and in spaced relation to each other on opposing surfaces of said jaws, one of said jaws having magnets of both polarities in a manner whereby when the said jaws are in one axial position relative to each other opposing ends of said magnets on said opposing surfaces are of opposite polarity and attract the said jaws to each other thereby simultaneously holding said objects clamped between them and when the said jaws are axially shifted relative to each other the opposing magnets are of the same polarity and repel the said jaws from each other thereby maintaining the said jaws separated, and a plate of non-magnetic material affixed to one of said jaws in a manner whereby said plate provides a stop for the clamped ends of said objects.

References Cited in the file of this patent

UNITED STATES PATENTS

| 1,652,030 | Luce | Dec. 6, 1927 |
| 2,565,891 | Sherman | Aug. 28, 1951 |

FOREIGN PATENTS

| 573,454 | Great Britain | Nov. 21, 1945 |
| 912,080 | Germany | May 24, 1954 |